United States Patent Office 3,240,774
Patented Mar. 15, 1966

3,240,774
METHOD OF INCREASING THE STIFFNESS OF HIGH DENSITY POLYETHYLENE
Frederick B. Joyner and Newton H. Shearer, Jr., Kingsport, Tenn., assignors to Eastman Kodak Company, Rochester, N.Y., a corporation of New Jersey
No Drawing. Filed Apr. 11, 1960, Ser. No. 21,092
4 Claims. (Cl. 260—94.9)

This invention relates to a process for improving the properties of high density polyethylene, i.e. polyethylene having a density of at least 0.94 g./cc. In a specific aspect this invention relates to a process for increasing the stiffness of high density polyethylene which is prepared in the presence of an ionic catalyst comprising a metal alkyl and a transition element compound.

It is known that ethylene can be polymerized to high molecular weight, high density polymeric compounds by subjecting the monomer to relatively mild conditions of temperature and pressure in the presence of ionic catalyst mixtures. The polymerization procedures employing such catalyst mixtures can be carried out at temperatures ranging from below room temperature, as, for example, temperatures of 0° C. or lower to temperatures in the order of 150° C. or higher. These catalysts are also effective at pressures from atmospheric to very high pressures in the order of 30,000 p.s.i. or higher, although only slightly superatmospheric pressures are usually required and hence pressures up to about 1,000 p.s.i. are ordinarily employed.

In general, the ionic catalysts that can be used in the polymerization of ethylene include those wherein an alkali metal alkyl, an aluminum, zinc or magnesium alkyl, or an aluminum hydride is employed as a catalyst in admixture with a transition metal compound, i.e. a halide, alkoxide or similar compound of titanium, zirconium or similar transition metal compound. The ionic catalysts generally involve the catalyst mixtures composed of transition metal compound wherein the metal is from the 4th to the 6th group of the Periodic Table and a metal alloy, metal hydride or organo metal compound from the 1st to the 3rd group of the Periodic Table. Thus, in Belgian Patents Nos. 533,362, 534,792, and 534,888, there is described a process for polymerizing ethylene using as the catalyst for the polymerization a mixture of a compound of a metal of groups IV-B, V-B, VI-B or VIII of the Periodic Chart, or manganese, in combination with an organometallic compound of an alkali metal, alkaline earth metal, zinc, earth metal (especially aluminum) or rare earth metal. The Periodic Chart referred to herein can be found in "Fundamental Chemistry," 2nd edition, by H. G. Deming, published by John Wiley & Sons, Inc.

One specific type of ionic catalyst which may be employed in this type of process in polymerizing ethylene involves the use of a catalyst prepared by admixing an aluminum alkyl or aryl with a reduceable compound of a metal of groups IV-B to VI-B of the Periodic Table. The aluminum alkyl or aryl component of the catalyst can be an aluminum trialkyl or triaryl, for example, aluminum triethyl, aluminum tripropyl, aluminum triisobutyl, aluminum trioctyl, aluminum tridecyl, aluminum triphenyl and the like, or one of the aluminum alkyl or aryls containing halogen, alkoxy, aryloxy or hydrogen as in diethyl aluminum chloride, dimethyl aluminum methoxide, diphenyl aluminum chloride, dimethyl aluminum methoxide, diphenyl aluminum bromide, dimethyl aluminum phenoxide and dibutyl aluminum hydride. The transition metal component of the catalyst is preferably a titanium halide, i.e. titanium tetrachloride, titanium tetrabromide, titanium tetraiodide or titanium trihalide, but, in general, it can be any reduceable compound of titanium, zirconium, thorium, tantalum, chromium, vanadium, tungsten or the like. The exact chemical nature of the catalyst is not known, but it would appear that the catalyst itself constitutes some sort of a reaction product in which the heavy metal is present in a reduced state.

High density polyethylene prepared in accordance with the procedures described above are generally characterized by a stiffness in flexure below 100,000 p.s.i. and usually below 85,000 p.s.i. (as measured by ASTM D747–50), depending to some extent on the ethylene reaction pressure employed. An increase in the stiffness in flexure of these high density ethylene polymers would, of course, increase their value and versatility as a plastic.

Accordingly, it is an object of this invention to provide a novel process for improving the properties of high density polyethylene.

A further object of this invention is to provide a novel process for increasing the stiffness in flexure of high density polyethylene.

A still further object is to provide a novel process for increasing the stiffness in flexure of high density polyethylene prepared in the presence of an ionic catalyst mixture.

Additional objects of this invention will be quite apparent from the detailed discussion appearing hereinbelow.

In our copending application Serial No. 676,372, filed August 5, 1957, now abandoned, there is described a method for rendering polyethylene produced in the presence of ionic catalyst mixtures substantially odor-free by contacting the polymer with a normally liquid hydrocarbon at a temperature not in excess of 80° C. to extract odor-causing low molecular weight polymeric hydrocarbons therefrom. We have now found that high density polyethylene, i.e. polyethylene having a density of at least 0.94, which has been prepared in the presence of an ionic catalyst mixture comprising a metal alkyl and a transition element compound at a pressure in excess of 40 p.s.i.g., can be extracted with a normally liquid hydrocarbon at a temperature in the range of about 40 to about 95° C. to effect an increase of 20 to 150% in the value of the stiffness modulus.

A surprising feature of this invention is that extraction under substantially identical conditions does not affect a significant increase in the stiffness of similar polyethylene prepared at reaction pressures of 40 p.s.i.g. or below. In addition, polyethylene prepared in the presence of other polymerization catalysts, such as a supported transition metal oxide catalyst shows little or no significant increase in stiffness when extracted according to the method of this invention. In contrast, extraction of polyethylene which has been prepared in the presence of an ionic catalyst comprising a metal alkyl and a transition metal compound at a reaction pressure greater than 40 p.s.i.g., will increase the stiffness modulus by 20 to 150% as pointed out hereinabove. Accordingly, it is possible to obtain ethylene polymers having stiffness values as high as 137,000 p.s.i.

Another particularly interesting feature of this invention is that polyethylene which is extracted according to the process of our invention exhibits a marked improvement in odor as well as in stiffness. The substantial removal of the acrid, burnt wax-like odors which usually remain with finished articles derived from high density polyethylene obviously constitutes a decided advantage to the manufacturer of such articles from the point of view of consumer acceptance.

The extractant which is employed in the practice of this invention is a normally liquid hydrocarbon inert to the polyethylene being used in the process. The preferred hydrocarbons are the aliphatic alkanes of from 5 to 15 carbon atoms. However, other normally liquid hydrocarbons can be used in the process. For example, cycloaliphatic hydrocarbons as well as normally liquid aromatic hydrocarbons can be used. Hence, suitable solvents which can be used in the practice of this invention include, for example, pentane, hexane, isohexane, heptane, isoheptane, octane, isooctane, cyclohexane, cycloheptane, cyclooctane, Decalin, benzene, toluene, xylene, Tetralin, ethylbenzene, cumene, mesitylene, pseudocumene and the like. Although mixtures of these solvents can be employed, it is generally preferred to use a single solvent.

In carrying out the process of this invention, the high density polyethylene to be extracted is contacted with a normally liquid hydrocarbon at an elevated temperature. This extraction can be carried out before or after isolation of the polyethylene from the reaction mixture by adding the polyethylene to a reaction vessel containing the hydrocarbon. The resulting slurry is then heated and preferably agitated to effect intimate contacting. However, the extraction step can be carried out continuously as well as batch-wise at a temperature in the range of about 40 to about 95° C., although the preferred range is from 50 to 90° C. Of course, extraction with low boiling solvents such as isopentane, neopentane and the like can be carried out in the preferred temperature range only at pressures above atmospheric.

The amount of hydrocarbon that is used in the process of this invention can be varied within a rather wide range and is obviously regulated by economic considerations. The minimum amount of hydrocarbon is that amount which results in a relatively non-viscous slurry that can be readily agitated. In many instances equivalent weight ratios of polymer to hydrocarbon extractant can be used. Actually, the slurry that is formed can contain a weight ratio of polymer to hydrocarbon extractant of about 0.1 to about 5. However, it will be realized that ratios outside of this range can be employed without departing from the scope of the invention.

It is preferred that the conditions of extraction be adjusted in order that substantially no fractions having an inherent viscosity in Tetralin at 145° C. in excess of 0.6 are removed. For example, we prefer to use heptane as the extraction solvent at a temperature just below its boiling point, i.e. at about 85 to about 90° C. Under these conditions, there is little loss of polyethylene having an inherent viscosity of about 0.6 in Tetralin at 145° C. Although the observed increase in stiffness of the polyethylene on extraction does not necessarily correlate with the amount or inherent viscosity of the polymer removed by the extraction, about 2 to about 15% of the polymer is normally removed by extraction. It is apparent that optimum conditions can be determined for any given solvent. However, in general we have found that the temperature range of about 40 to about 90° C. will be suitable with any given solvent.

Any of the well known ionic, metal alkyl-transition element compound catalysts which have been described in great detail hereinabove can be used to prepare polyethylene of value in the practice of this invention. However, it is preferred that the polyethylene used be prepared in the presence of an ionic catalyst comprising an aluminum alkyl and a tetra- or trivalent titanium halide or alkoxide. The method of polymerization, ratios of catalyst components, catalyst concentrations, solvents and reaction temperatures used in the preparation of polyethylene include those which are conventionally employed in the prior art. Hence, suitable ratios of catalyst components include ratios of metal alkyl to transition element compound of about 1:1 to about 1:4 or higher and suitable catalyst concentrations may vary between about .05 and a few percent by weight or higher, based on the weight of olefin monomer that is being polymerized. However, it is necessary that ethylene reaction pressures be in excess of 40 p.s.i.g. In this connection it is to be noted that the operable ethylene reaction pressures can be as high as 30,000 p.s.i.g. and higher although the preferred pressure range is about 50 to 1,000 p.s.i.g. and the preferred temperature range for the polymerization is from 45 to 200° C.

This invention can be further illustrated by the following examples of preferred embodiments thereof although it will be understood that these examples are included merely for purposes of illustration and are not intended to limit the scope of the invention unless otherwise specifically indicated:

*Example 1*

In a 20-gal. reactor equipped with a high-speed stirrer and protected by an atmosphere of dry nitrogen were placed 80 lb. of dry heptane, 45.5 g. of titanium tetrachloride, and 109 g. of triethyl-aluminum. Stirring was continued as ethylene was admitted and maintained at 50 p.s.i. gauge pressure. The mixture was maintained at about 60° C. for 12 hours. During this period 40 lb. of ethylene was absorbed.

The reaction mixture was maintained under a nitrogen atmosphere while it was dropped to another 20-gal. kettle similar to the polymerization reactor and also equipped with a high-speed stirrer. Here the heptane was removed by filtration. About 45–50 lb. of fresh heptane was added, and the mixture was heated to 85° C. with rapid stirring under a nitrogen atmosphere. After 30 minutes, the heptane was removed while hot by filtration. This extraction operation was repeated three times. The polymer was then washed eight successive times with 75-lb. portions of dry methanol. Finally the polymer was dried under vacuum in a dryer. The extracted polyethylene was found to have a stiffness of 89,000 p.s.i. (ASTM D747–50). In contrast, a sample of the polyethylene isolated prior to the heptane extraction had a stiffness of 54,000 p.s.i.

*Example 2*

As pointed out hereinabove, extraction of an ethylene polymer prepared in the presence of an ionic cationic catalyst comprising a metal alkyl and a transition element compound at 40 p.s.i.g. or below will not affect any significant increase in the stiffness. Hence, the procedure of Example 1 was followed except that the ethylene was admitted and maintained at 40 p.s.i.g. pressure during the polymerization. The resulting polyethylene was found to have a stiffness of 61,000 p.s.i. A sample of the polymer isolated prior to the heptane extraction had a stiffness of 56,000 p.s.i. The increase in stiffness observed on extraction is less than 10% of the stiffness of the unextracted polyethylene. Thus, it can be seen that extraction of the polyethylene made at 40 p.s.i. reaction pressure produced no significant increase in stiffness.

*Example 3*

A sample of high-density polyethylene made using a chromium oxide catalyst supported on silica-alumina and having a melt index of 0.9 and a density of 0.964 was extracted continuously with heptane at 90–95° C. for 24 hours. About 13% of the original polyethylene was removed by extraction as a hard, crystalline wax having an inherent viscosity in Tetralin at 145° C. of 0.26. The extracted polymer was found to have a melt index of 0.19 and a stiffness of 58,000 p.s.i. Before extraction, the melt index was 0.9 and the stiffness was 74,000 p.s.i. Thus, this type of polyethylene not only did not undergo an increase in stiffness on extraction but rather underwent decrease.

Examples 4–14

The following examples further illustrate this invention. In each case the polyethylene was isolated before extraction.

| Example | Ethylene pressure, p.s.i. | Aluminum alkyl | Titanium compound | Molar ratio, Al:Ti | Catalyst conc. percent $MR_x^1$ | Reaction temperature, °C. | Type [2] | Extraction solvent | Temp., °C. | Polymer stiffness [3] Before ext'n. | Polymer stiffness [3] After ext'n. |
|---|---|---|---|---|---|---|---|---|---|---|---|
| 4 | 50 | $Al(C_2H_5)_3$ | $TiCl_4$ | 2:1 | 3.0 | 55 | Continuous | Heptane | 85–90 | 52,000 | 128,000 |
| 5 | 80 | $Al(C_2H_5)_3$ | $TiBr_4$ | 2:1 | 0.1 | 45 | do | Cyclohexane | 70–75 | 59,000 | 72,000 |
| 6 | 150 | $Al(C_2H_5)_3$ | $TiCl_3$ | 1:1 | 0.05 | 70 | Batch | Heptane | 85–90 | 91,000 | 137,000 |
| 7 | 290 | $Al(CH_3)_3$ | $TiCl_4$ | 4:1 | 1.0 | 150 | Continuous | do | 85–90 | 84,000 | 105,000 |
| 8 | 80 | $Al(C_2H_5)_2Cl$ | $Ti(OC_4H_9)_4$ | 6:1 | 0.5 | 100 | do | Benzene | 70–75 | 54,000 | 80,000 |
| 9 | 200 | $Al_2(C_2H_5)_3Br_3$ | $Ti(OC_4H_9)_4$ | 2:1 | 0.25 | 190 | do | Hexane | 60–65 | 65,000 | 87,000 |
| 10 | 50 | $Al_2(C_2H_5)_3Br_3$ | $TiCl_4$ | 1:1 | 0.25 | 60 | do | Tetralin | 75–80 | 49,000 | 79,000 |
| 11 | 100 | $Al(C_8H_{17})_3$ | $TiCl_4$ | 2:1 | 0.5 | 70 | Batch | 1-octene | 85–90 | 56,000 | 72,000 |
| 12 | 80 | $AlH(C_4H_9)_2$ | $TiCl_4$ | 4:1 | 0.1 | 55 | do | Pentadecane | 85–90 | 65,000 | 97,000 |
| 13 | 80 | $Al(C_2H_5)_2Cl$ | $TiCl_2(OC_4H_9)_2$ | 3:1 | 0.25 | 85 | Continuous | Heptane | 85–90 | 56,000 | 101,000 |
| 14 | 1,000 | $Al(C_2H_5)_3$ | $TiCl_3$ | 1:1 | 0.05 | 75 | do | do | 85–90 | 96,000 | 125,000 |

[1] Percent by weight of solvent used.
[2] Continuous extractions carried out for 24 hr. Batch extractions consisted of four 30-minute extractions.
[3] ASTM D747-50.

Example 15

This example illustrates the importance of employing elevated temperatures in the extraction of high-density polyethylene to increase the stiffness of the resin.

A sample of polyethylene prepared at a reaction pressure of 40 p.s.i.g. according to the procedure of Example 1 was isolated without a hydrocarbon extraction. This polymer had a density of 0.956 g./cc. and a stiffness of 54,000 p.s.i. Part of this polyethylene was given four 30-minute batch-wise extractions with hexane in a stirred vessel at room temperature (<35° C.) and part was extracted in a similar manner at 50–55° C. and at 60–65° C. The results obtained are given in the following table:

| Extraction Solvent | Temp., °C. | Polymer stiffness [1] Before extraction | Polymer stiffness [1] After extraction |
|---|---|---|---|
| Hexane | 23–25 | 54,000 | 54,000 |
| Do | 25–30 | 54,000 | 52,000 |
| Do | 30–35 | 54,000 | 55,000 |
| Do | 50–55 | 54,000 | 68,000 |
| Do | 60–65 | 54,000 | 77,000 |

[1] ASTM D747-50.

Thus, it can be seen that the extractions carried out at room temperature (<35° C.) were substantially ineffective with regard to improving the stiffness of the polyethylene. Extractions carried out at the higher temperatures, however, resulted in significant increases in the stiffness of the resin.

Hence, as stated hereinabove and particularly illustrated by Examples 2, 3 and 15, in order to achieve the desired increase in stiffness according to our invention it is necessary that the polymer be prepared at pressures in excess of 40 p.s.i.g., that an ionic metal alkyl-transition element catalyst be employed in the polymerization reaction and the extraction must be carried out at elevated temperatures.

The process of this invention can be readily adapted to the known procedures for producing high density polyethylene in the presence of an ionic catalyst comprising a metal alkyl and a transition element compound at pressures in excess of 40 p.s.i.g. It is known, of course, that in the production of high density polyethylene, it is usually desirable to wash entrained catalysts from the polyethylene. Washing can be carried out by agitating a slurry of the polyethylene in a lower aliphatic alcohol such as methanol, ethanol, propanol, isopropanol and the like. If desired, a small amount of a mineral acid such as hydrochloric acid can be used to acidify the alcohol during the washing step. The process of this invention can be suitably attached to the polyethylene production procedure by applying it to the polyethylene coming from the polymerization reactor and prior to the washing of the polyethylene with alcohol. Alternatively, the process of this invention can be practiced upon the high density polyethylene after it has been washed with alcohol for extraction of entrained catalyst. However, in a continuous process for producing polyethylene, it is preferable to employ the extraction step of this invention between the polymerization reaction and the washing of the polyethylene with alcohol.

Thus, the process of this invention provides a method for increasing the stiffness of high density polyethylene to increase its value and versatility as a plastic. The resulting high density polyethylene can, of course, be used where the increased stiffness is of significance. For example, a high density ethylene polymer having increased stiffness can be used in the production of plastic sheets as well as a multitude of other mechanical shapes and forms.

Although the invention has been described in considerable detail with reference to certain preferred embodiments thereof, it will be understood that variations and modifications can be affected without departing from the spirit and scope of the invention as described hereinabove and as defined in the appended claims.

We claim:

1. The method of increasing the stiffness of high density polyethylene which comprises polymerizing ethylene to form a high molecular weight polyethylene having a density of at least 0.94 in the presence of a catalyst comprising a metal alkyl and a transition element compound at a pressure in excess of 40 p.s.i.g., separating said polyethylene from the polymerization reaction mixture and contacting the separated polyethylene with a normally liquid hydrocarbon at a temperature in the range of about 40 to about 95° C.

2. The method of increasing the stiffness of high density polyethylene which comprises polymerizing ethylene to form a high molecular weight polyethylene having a density of at least 0.94 in the presence of a catalyst comprising a metal alkyl and a titanium compound at a pressure in the range of about 40 to about 30,000 p.s.i.g., separating said polyethylene from the polymerization reaction mixture and contacting the separated polyethylene with a normally liquid hydrocarbon at a temperature in the range of about 45 to about 95° C.

3. The method of increasing the stiffness of high density polyethylene which comprises polymerizing ethylene to form a high molecular weight polyethylene having a density of at least 0.94 in the presence of an ionic catalyst comprising an aluminum alkyl and a titanium compound at a pressure in excess of 40 p.s.i.g., separating said polyethylene from the polymerization reaction mixture and contacting the separated polyethylene with a normally liquid hydrocarbon at a temperature in the range of about 40 to about 95° C.

4. The method of increasing the stiffness of a high density polyethylene which comprises polymerizing ethylene to form a high molecular weight polyethylene having a density of at least 0.94 in the presence of an ionic catalyst comprising an aluminum alkyl and a titanium compound at a pressure in excess of 40 p.s.i.g., separating said polyethylene from the polymerization reaction mixture and contacting the separated polyethylene with heptane at a temperature in the range of about 85 to about 90° C.

References Cited by the Examiner

UNITED STATES PATENTS

| 2,825,721 | 3/1958 | Hogan et al. | 260—94.9 |
| 2,846,427 | 8/1958 | Findlay | 260—94.9 |
| 2,887,471 | 5/1959 | Shearer et al. | 260—94.9 |
| 2,887,473 | 5/1959 | Balthis | 260—94.9 |
| 2,927,105 | 3/1960 | Neinburg et al. | 260—94.9 |
| 2,993,881 | 7/1961 | Geiser et al. | 260—94.9 |

JOSEPH L. SCHOFER, *Primary Examiner.*

MORRIS LIEBMAN, LEON J. BERCOVITZ, WILLIAM H. SHORT, *Examiners.*